Patented Feb. 17, 1953

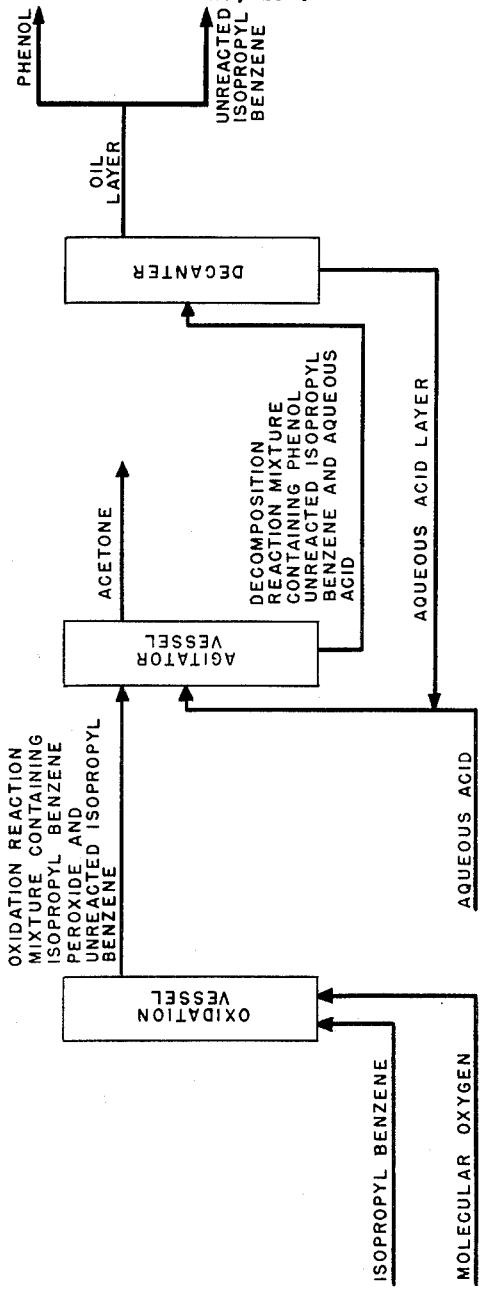

2,628,983

UNITED STATES PATENT OFFICE 2,628,983

MANUFACTURE OF PHENOLS

Basil Vivian Aller, Dorking, Reginald Harold Hall, Sutton, Denis Cheselden Quin, Epsom, and Karl Heinrich Walter Turck, Banstead, England, assignors, by mesne assignments, to Hercules Powder Company, a corporation of Delaware Application January 29, 1948, Serial No. 5,178
In Great Britain February 13, 1947

Section 1, Public Law 690, August 8, 1946
Patent expires February 13, 1967

23 Claims. (Cl. 260—621)

This invention relates to improvements in and a process for the production of phenols and refers in particular to the manufacture of phenols by the acid decomposition of peroxides obtained by the oxidation by means of molecular oxygen of benzene derivatives in which the substituents are one or more alkyl groups and one of which has a tertiary carbon atom in the alpha position to the benzene ring.

Hock and Lang have shown in Berichte, 1944, volume 77, page 257, that when isopropyl benzene is subjected to autoxidation with the concurrent exposure to short wave irradiation, isopropyl benzene peroxide is formed and that the free peroxide obtained by treating the oxidised reaction mixture with aqueous alkali solution and subsequent acidification of the purified alkali metal salt can be decomposed by refluxing with a 10% sulphuric acid solution whereby phenolic compounds as well as carbonyl compounds such as acetone, are produced.

The present invention is based on the discovery that when benzene derivatives of the kind mentioned are oxidised in the liquid phase by gaseous oxygen, percompounds are formed. These are only partly precipitated even with strong alkali solutions and substantial parts remain dissolved in the unchanged alkyl benzene, but will also yield phenols on treatment with acids.

Although the textbooks refer generally to peroxides as the products of similar oxidation reactions we have found that the compounds formed in a number of cases are actually hydroperoxides. Throughout this specification therefore, the expression "peroxide" is used to include hydroperoxides as well as peroxides.

According to the present invention, the process for producing a phenol comprises oxidising in the liquid phase benzene derivatives in which the substituents are at least one alkyl group, and one of which has a tertiary carbon atom in the alpha position to the benzene ring, by molecular oxygen to produce a peroxide therefrom, effecting the oxidation only to such an extent that the resulting liquid reaction mixture contains a substantial amount of unchanged alkyl benzene, heating the resulting liquid reaction mixture in intimate contact with acid until the said peroxide contained therein is practically completely decomposed and recovering the phenolic compounds thus produced.

The oxidation of the said benzene derivatives is only carried out to such an extent that a substantial amount of the starting material remains unaffected. Thus, it has been found advantageous when isopropyl benzene is used as starting material to stop the oxidation after about 10 to about 50% of the initial isopropyl benzene has been converted into the corresponding peroxide. On increasing the proportion of peroxide in the reaction mixture beyond the upper limit indicated above the oxidation efficiency begins to drop and the process becomes less economical.

The minimum concentration of the peroxide in the unreacted alkyl benzene is governed by economic reasons, whilst the maximum concentration depends on considerations of safety since too high a concentration of peroxide might give rise to explosions.

The oxidation of the alkyl benzene may be carried out by passing molecular oxygen through the heated alkyl benzene in the presence or absence of inert solvents. Such solvents are for instance toluene, xylene or the like.

An alternative method of carrying out the oxidation of the said alkyl benzene comprises effecting the oxidation in an oil-in-water dispersion or emulsion at an elevated temperature, advantageously in the presence of emulsifying agents such as sodium stearate, or sodium ricinoleate which facilitate the formation of and improve the dispersion or emulsification of the oil phase in the water.

The decomposition of the percompounds is effected by heating the reaction mixture resulting from the oxidation step with acids, preferably to boiling temparture. The heating may be carried out under pressure. As acids for effecting the decomposition any acid may be used which under the conditions of the process is indifferent towards the oxidising effect of the components in the reaction mixture; preferably dilute sulphuric acid may be used. Other suitable acids are phosphoric acid, hydrochloric acid or organic acids such as acetic acid, aryl sulphonic acids such as p-toluene sulphonic acid and the like. The strength of said acids may vary within very wide limits and is governed partly by the fact that acids of lesser concentration require a longer time to achieve complete or practically complete decomposition of the percompounds. Thus, with a 1% sulphuric acid the decomposition is practically complete within 5 hours, whilst a 10% sulphuric acid requires only one hour to obtain the same result. It is surprising that a solution which contains, for instance, 20% of percompounds dissolved in the unchanged alkyl benzene, requires only comparatively short times for obtaining the substantially complete decomposition of said peroxides, when compared with the time required for the decomposition of pure peroxide.

The temperature at which the decomposition is effected may, also, vary within wide limits up to 140° C. or more with dilute mineral acids or weak hydrocarbon-soluble acids such as acetic acid. It is preferable, however, to use dilute mineral acid and to work at the boiling point of the aqueous mixture because in this way a good mixing of the two phases is achieved. In many cases this permits the carbonyl compounds to be removed as vapour at the rate at which they are formed.

The use of acetic and other organic acids such as p-toluene sulphonic acid as the agent for decomposing the percompounds offers the advantage that the reaction mixture is homogeneous, the amount of water present being so small that separation into two phases is avoided, but the subsequent recovery of the phenol from the reaction mixture is cumbersome.

If the mixture, on the other hand is heterogeneous, the rate of decomposition can be considerably increased by mechanical agitation or emulsification.

In place of acids, use may also be made of hydrogen ion exchange materials such as sulphonated phenol-formaldehyde resins like the one known under the trade name "Zeocarb HIT" or sulphonated coals, preferably at elevated temperatures.

By carrying out the process in this way it is possible to obtain yields of phenols of more than 80% calculated on the total percompounds present in the reaction mixture. This is the more surprising in view of the presence of the initial alkyl benzene during the decomposition of the peroxides, which, according to previous knowledge might be expected to react with said alkyl benzene under the conditions prevailing during the decomposition.

Furthermore, the use of unchanged alkyl benzene in conjunction with the peroxide during the decomposition step has the additional advantage that any high boiling byproducts or condensation products are kept in solution, whereby a smooth decomposition of the peroxides is made possible. These resinous products might otherwise deposit on and stick to the walls of the reactor and thereby easily cause over-heating, and by serving as solvents for fresh peroxides give rise to violent and explosive decomposition of said peroxides.

The recovery of the products resulting from the process according to the present invention may be achieved in various ways. When there are two phases they may be separated from each other by decantation and the aqueous phase returned to the decomposing vessel. The oil phase may be distilled and the unchanged alkyl benzene obtained as distillate whilst the phenolic compounds remain in the still as residue.

As it is practically impossible to recover unchanged alkyl benzene used for the oxidation free from phenols by a mere fractionation of the oil layer, it has been found advantageous to remove the remaining phenol from the accompanying recovered alkyl benzene by extraction, for instance, with an aqueous alkali metal hydroxide solution or by adsorption. This is found to be especially desirable if the recovered alkyl benzene is to be returned to the oxidation stage, as the presence of phenols in the mixture to be oxidised is found to have a deleterious effect on the oxidation or at least to reduce its rate to a very large extent.

It has further been found that the alkyl benzene fraction recovered from the process contains a small amount of styrene compounds and that the phenol fraction is sometimes contaminated by acetophenone. If the unchanged alkyl benzene is intended to be returned to the oxidation stage, it has been found to be advantageous to avoid the obnoxious effect of said styrenes, for instance, methyl styrene. This may be done by hydrogenation of the styrenes e. g. in the liquid phase for instance at temperatures such as 90°-100° C., so that the said alkyl benzene remains unaffected, or by their removal, for instance, by washing the fraction with sulphuric acid and/or alkali permanganate solution previous to its return. The acetophenone is separated preferably by fractional distillation of the phenol fraction.

It is preferred to carry out the fractionation of the oily layer resulting from the acid decomposition under reduced pressure, for instance, at 100 mm. Hg, in order to avoid losses by condensation of the reaction products whereby high boiling compounds are formed. It is desirable to remove from the oily layer any acid which might adhere to it, for instance, by washing with water or slightly alkaline water or by the addition of a solid neutralising agent.

Another method of working up the reaction products from the acid decomposition consists in distilling said products with live steam with fractionation. If, for instance, isopropyl benzene is the starting material for the oxidation on distilling the mixture containing the decomposition products of the peroxides a mixture of isopropyl benzene and water with only traces of phenol is obtained as distillate when the distillation is carried out at normal pressure at a temperature of between 93° and 95° C. From the aqueous residue phenol is recovered by distillation or preferably by extraction with a water immiscible solvent.

The process according to the invention may be carried out batchwise or continuously. Thus, for instance, a reaction mixture resulting from the oxidation of isopropyl benzene by means of molecular oxygen and containing a given amount of isopropyl benzene peroxide mixed with unreacted isopropyl benzene, is mixed in an agitator vessel by vigorous agitation with the acid layer and heated preferably to boiling point until substantially all the percompounds have been decomposed, while simultaneously acetone is removed as vapour from the vessel. When working continuously, oil phase and aqueous phase may be fed to the reactor at a constant rate while at the same time a corresponding amount of the mixture is withdrawn from the reactor to a decanter from which the aqueous layer is returned to the reactor. The phenolic compounds produced are contained in the oil layer which leaves the decanter to be distilled. Such a process is illustrated in the accompanying drawing. As shown therein, isopropyl benzene and molecular oxygen are introduced into an oxidation vessel wherein there is formed an oxidation reaction mixture containing isopropyl benzene peroxide and unreacted isopropyl benzene. The oxidation reaction mixture then may be introduced into an agitator vessel along with an aqueous acid, this resulting in decomposition of the isopropyl benzene peroxide in the oxidation reaction mixture to phenol and acetone. A decomposition reaction mixture containing phenol, unreacted isopropyl benzene and aqueous acid then may be withdrawn from the agitator vessel and fed to a decanter where the oil and aqueous acid layers are separated. The aqueous acid layer may be returned to the agitator vessel, and the oil layer containing phenol and unreacted isopropyl benzene may be distilled to effect separation of phenol. In order to ensure substantially complete conversion of the percompounds during the acid decomposition, a number of reactors may be used in series, or one reactor with several compartments through which the mixture has to pass in series may be used.

It should be understood, that the process applies to alkyl benzene hydrocarbons which are substituted by one or more alkyl groups, at least one of which has a tertiary carbon atom in the alpha position to the benzene ring in general, and that by phenolic compounds those phenols are meant which may contain, in addition to the hydroxy group, one or more alkyl groups as further substituents in the benzene ring.

The following examples illustrate the way by which the process may be carried out in practice.

Example 1

In a vessel provided with an efficient agitator a mixture consisting of 200 cc. pure isopropyl benzene, 400 cc. of water, 0.3 gram stearic acid and 30 cc. n/5 sodium hydroxide (added in portions during the oxidation to maintain the emulsion), was heated at 85° C. with oxygen till the oil layer contained 44.8% w./v. of peroxide (calculated as isopropyl benzene peroxide).

50 cc. of the oil layer were agitated with a concentrated solution of sodium hydroxide. The aqueous liquid was acidified cautiously with dilute sulphuric acid and the resultant mixture was boiled under reflux and finally distilled while the liquid volume in the boiling flask was maintained by addition of water. The distillation was stopped when the distillate gave a negative test for phenol. 6.7 grams of phenol were obtained in this way, which corresponds to a yield of 48.5% on the peroxide contained in the oil layer from the oxidation.

Another 50 cc. of the oil layer were refluxed with 90 grams of a 10% sulphuric acid for 90 minutes in the same way as above. The amount of phenol obtained was 11.34 grams i. e. in a yield of 81.8% on the peroxide contained in the oil layer from the oxidation. Acetone was obtained as distillate in a yield of 72% of theory. When hydrochloric or phosphoric acids were used in an analogous way to that described with sulphuric acid similar results were obtained.

Example 2

50 cc. of a solution of isopropyl benzene peroxide in isopropyl benzene containing 14.6 grams peroxide, obtained by oxidation of isopropyl benzene with gaseous oxygen at 85° C., and 30 cc. of glacial acetic acid were heated in a boiling water bath for 90 minutes, after which time 8.51 grams of the percompounds still remained undecomposed.

The mixture was therefore refluxed for a further 90 minutes, after which time more than 97.5% of the initial percompounds had been decomposed. The mixture then contained 6.45 grams of phenol, which corresponds to a yield of 72% of theory.

Example 3

A mixture of 260 cc. of an oxidation mixture obtained by heating isopropyl benzene with oxygen so as to prepare the percompounds thereof (the oil contained 81.2 grams percompounds; found analytically and calculated as isopropyl benzene hydroperoxide), and 520 cc. of a 1% w./w. aqueous sulphuric acid was boiled under reflux while being stirred vigorously. After 90 minutes 57% of the percompounds had been converted. The treatment was continued for another two hours, after which time 85% of the percompounds originally present had disappeared. Another two hours' treatment resulted in a 95% conversion of the percompounds. During the whole treatment the acetone produced by the acid decomposition was removed by fractional distillation, the distillate being acetone of 99.8% purity, as determined by the hydroxylamine method and refractive index. The liquid in the kettle was carefully fractionated.

The fraction boiling at 93.5° C./750 mm. Hg to 95° C./760 mm. Hg separated into two phases, the oil layer (160 cc.) containing besides isopropyl benzene, about 0.9% v./v. of methylstyrene, and 0.34 gram of phenol, the water layer (100 cc.) containing 0.14 gram of phenol.

The second fraction, boiling at 95.97° C. (760 mm. Hg) consisted of 14 cc. oil layer containing 1.5 grams of methyl styrene and about 0.3 gram of acetophenone and 0.02 gram of phenol, and 12 cc. of an aqueous layer containing 0.02 gram of phenol.

The residue of the fractionation, which still formed two phases, was made strongly alkaline, and the alkaline solution decanted from undissolved oil. 34.8 grams of phenol were found in this alkaline solution, which corresponds to a yield of 70% on the peroxide in the original oil layer from the oxidation.

Example 4

The effect of stirring on the rate of decomposition of the percompounds in the acid treatment is seen from the following table.

75 cc. of a peroxide solution in isopropyl benzene were mixed with 75 cc. of a 10% w./w. aqueous sulphuric acid and refluxed gently, in one case wtih stirring, in the other without it. Periodically samples were withdrawn and analysed for percompound content in the oil phase.

| Time/min. | Stirred | Percent Decomposition Unstirred |
|---|---|---|
| 10 | 50 | 26 |
| 20 | 68 | 38 |
| 30 | 78 | 46 |
| 40 | 85 | 57 |
| 50 | 89 | 61 |
| 60 | 93 | 76 |
| 90 | 96 | 84 |
| 120 | 97 | 91 |

Example 5

To 100 cc. of a solution of 15.5% w./v. isopropyl benzene peroxide in isopropyl benzene was added 0.1 gram of paratoluene sulphonic acid. On heating the mixture vigorous reaction took place at about 110° C. Acetone distilled off. Phenol present in the reaction mixture amounted to 5.9 grams, that is a yield of 62%, the acetone present came to 1.75 grams, equal to 30.1%.

Example 6

A solution of 200 cc. of 15.5% of isopropyl benzene peroxide in isopropyl benzene was heated with 20 grams of hydrogen ion exchange material known under the trade name of "Zeocarb HIT" which is a sulphonated phenol formaldehyde resin, with agitation to 90° C. After one hour the peroxide had substantially disappeared. The phenol in the mixture amounted to 5.4 grams, equal to 56.8%. The reaction was also carried through by passing the oxidation reaction mixture through a column charged with sulphonated coal. The column was heated externally to 95° to 100° C. and the residence time of the mixture in the column was 2 hours. 51% of the peroxide was converted into phenol.

*Example 7*

When paracymene was oxidised at 90° C. with molecular oxygen a solution of 9.5 grams cymene hydroperoxide in unchanged paracymene was obtained. 100 cc. of this solution were thoroughly mixed with 10% sulphuric acid and heated under reflux and with agitation for three hours. After this time the peroxide had substantially disappeared and had been converted into paracresol.

We claim:

1. A process for the production of phenols, which comprises oxidizing in the liquid phase a benzene homologue in which the benzene ring is substituted by at least one alkyl group, one of which has a tertiary carbon atom in the alpha position to the benzene ring, by molecular oxygen, whereby per-compounds are produced therefrom, terminating the oxidation while the resulting reaction mixture contains a substantial amount of unreacted alkyl benzene, reacting said per-compounds dissolved in said unreacted alkyl benzene by bringing the mixture resulting from said oxidation reaction into intimate contact with acid until decomposition of the per-compounds is practically complete, and separating the produced phenols and ketone from the resulting reaction mixture.

2. A process for the production of phenols, which comprises oxidizing in the liquid phase a benzene homologue in which the benzene ring is substituted by at least one alkyl group, one of which has a tertiary carbon atom in the alpha position to the benzene ring, by molecular oxygen, whereby per-compounds are produced therefrom, terminating the oxidation when at least about 10% and not more than 50% of the benzene homologue has been converted into per-compounds, reacting said per-compounds dissolved in said unreacted alkyl benzene by bringing the mixture resulting from said oxidation reaction into intimate contact with acid until decomposition of the per-compounds is practically complete, and separating the produced phenols and ketone from the resulting reaction mixture.

3. A process for the production of phenols, which comprises oxidizing in the liquid phase a benzene homologue in which the benzene ring is substituted by at least one alkyl group, one of which has a tertiary carbon atom in the alpha position to the benzene ring, by molecular oxygen, whereby per-compounds are produced therefrom, terminating the oxidation while the resulting reaction mixture contains a substantial amount of unreacted alkyl benzene, reacting said per-compounds dissolved in said unreacted alkyl benzene by bringing the mixture resulting from said oxidation reaction into intimate contact with a member selected from the group consisting of sulphuric acid, hydrochloric acid, phosphoric acid, acetic acid, tri-chloro-acetic acid and aryl sulphonic acids until decomposition of the per-compounds is practically complete, and separating the produced phenols and ketone from the resulting reaction mixture.

4. A process for the production of phenol, which comprises oxidizing isopropyl benzene with molecular oxygen, whereby per-compounds are produced therefrom, terminating the oxidation when at least about 10% and not more than 50% of the isopropyl benzene has been converted into per-compounds, reacting said per-compounds in solution in the unreacted isopropyl benzene by bringing the mixture resulting from said oxidation reaction into intimate contact with acid until said per-compounds are practically completely decomposed, and separating the produced phenol and acetone from the resulting reaction mixture.

5. A process for the production of phenol, which comprises oxidizing isopropyl benzene with molecular oxygen, whereby per-compounds are produced therefrom, terminating the oxidation when at least about 10% and not more than 50% of the isopropyl benzene has been converted into per-compounds, reacting said per-compounds in solution in the unreacted isopropyl benzene by bringing the mixture resulting from said oxidation reaction into intimate contact with a member selected from the group consisting of sulphuric acid, hydrochloric acid, phosphoric acid, acetic acid, tri-chloro-acetic acid and aryl sulphonic acids until said per-compounds are practically completely decomposed, separating the resulting aqueous acid phase from the concomitantly-produced oil phase containing unreacted isopropyl benzene, returning said aqueous phase for a further per-compound decomposition, and recovering phenolic compound from the oil phase.

6. A process as claimed in claim 5 wherein the unreacted isopropyl benzene in the oil phase is separated from the phenolic compound by live steam distillation and the phenol is withdrawn at the bottom of the still in aqueous solution.

7. A process as claimed in claim 6 in which the distillate from the live steam distillation of the oil phase is condensed and the isopropyl benzene thus recovered is recycled for the production therefrom of fresh isopropyl benzene peroxide, after it has been freed from any residual phenol.

8. A process for the production of phenol, which comprises oxidizing isopropyl benzene with molecular oxygen, whereby per-compounds are produced therefrom, terminating the oxidation when at least about 10% and not more than 50% of the isopropyl benzene has been converted into per-compounds, reacting said per-compounds in solution in the unreacted isopropyl benzene by bringing the mixture resulting from said oxidation reaction into intimate contact with a member selected from the group consisting of sulphuric acid, by hydrochloric acid, phosphoric acid, acetic acid, tri-chloro-acetic acid and aryl sulphonic acids until said per-compounds are practically completely decomposed, separating the resulting aqueous acid phase from the concomitantly-produced oil phase containing unreacted isopropyl benzene, and recovering the unchanged isopropyl benzene from the oil phase by distillation in vacuum.

9. A process as claimed in claim 8 in which the oil phase is freed from the acid before subjecting it to distillation.

10. A process as claimed in claim 9 in which the removal of the acid is carried out by washing with aqueous alkali.

11. A continuous process for the production of phenol, which comprises oxidizing isopropyl benzene with molecular oxygen, whereby per-compounds are produced therefrom, terminating the oxidation while the resulting reaction mixture contains a substantial amount of unreacted isopropyl benzene, reacting said per-compounds in solution in the unreacted isopropyl benzene by bringing the mixture resulting from said oxidation reaction into intimate contact with acid until said per-compounds are practically completely decomposed, separating the produced phenol and acetone from the resulting reaction mixture, and returning the unreacted isopropyl benzene for further oxidation after it has been freed from phenol, acetone, methyl styrene and acetophenone.

12. A continuous process for the production of phenol, which comprises oxidizing isopropyl benzene with molecular oxygen, whereby per-compounds are produced therefrom, terminating the oxidation when at least about 10% and not more than 50% of the isopropyl benzene has been converted into per-compounds, reacting said per-compounds in solution in the unreacted isopropyl benzene by bringing the mixture resulting from said oxidation reaction into intimate contact with acid until said per-compounds are practically completely decomposed, separating the produced phenol and acetone from the resulting reaction mixture, and returning the unreacted isopropyl benzene for further oxidation after it has been freed from phenol, acetone, methyl styrene and acetophenone.

13. A continuous process for the production of phenol, which comprises oxidizing isopropyl benzene with molecular oxygen, whereby per-compounds are produced therefrom, terminating the oxidation when at least about 10% and not more than 50% of the isopropyl benzene has been converted into per-compounds, reacting said per-compounds in solution in the unreacted isopropyl benzene by bringing the mixture resulting from said oxidation reaction into intimate contact with a member selected from the group consisting of sulphuric acid, hydrochloric acid, phosphoric acid, acetic acid, tri-chloro-acetic acid and aryl sulphonic acids until said per-compounds are practically completely decomposed, separating the produced phenol and acetone from the resulting reaction mixture, and returning the unreacted isopropyl benzene for further oxidation after it has been freed from phenol, acetone, methyl styrene and acetophenone.

14. A process for the production of a phenol which comprises oxidising in the liquid phase a benzene homologue in which the benzene ring is substituted by at least one alkyl group one of which has a tertiary carbon atom in the alpha-position to the benzene ring by molecular oxygen containing gases to produce a peroxide therefrom, effecting the oxidation only to such an extent that the resulting reaction mixture contains a substantial amount of unchanged alkyl benzene and that about 10 to about 50% of the initial benzene homologue is converted into the corresponding peroxide, reacting at elevated temperatures the resulting mixture with a hydrocarbon-soluble acid until said peroxide in said alkyl benzene is practically completely decomposed, and recovering the phenolic compound thus produced.

15. A process for the production of phenol which comprises oxidising in the liquid phase isopropyl benzene with molecular oxygen-containing gases to produce isopropyl benzene peroxide therefrom, effecting the oxidation to such an extent that the resulting reaction mixture contains a substantial amount of unchanged isopropyl benzene and that about 10 to 50% of the initial isopropyl benzene is converted into isopropyl benzene peroxide reacting at elevated temperatures the resulting solution of isopropyl benzene peroxide in isopropyl benzene with an acid soluble in isopropyl benzene until said peroxide is practically completely decomposed, and recovering phenol and acetone from said acid solution.

16. Process for the production of a phenol which comprises oxidising a benzene homologue in which the benzene ring is substituted by at least one alkyl group one of which has a tertiary carbon atom in the alpha position to the benzene ring by passing a molecular oxygen containing gas through an emulsion of said benzene homologue in water to produce a peroxide therefrom, effecting the oxidation only to such an extent that the resulting reaction mixture contains a substantial amount of unchanged alkyl benzene and that about 10 to about 50% of the initial benzene homologue is converted into the corresponding peroxide, separating the aqueous from the oily phase of said reaction mixture, reacting at elevated temperatures the peroxide in the oily phase with a hydrocarbon-soluble acid until said peroxide in said unchanged alkyl benzene is practically completely decomposed, and recovering the phenolic compound thus produced.

17. Process as claimed in claim 14 wherein the unchanged alkyl benzene is separated from the phenolic compound produced by distillation in the presence of water.

18. Process as claimed in claim 17 in which the distillate from the distillation in the presence of water is condensed and the alkyl benzene thus recovered is recycled for the production therefrom of fresh alkyl benzene peroxide, after it has been freed from any residual phenol.

19. A process for the production of phenols, which comprises oxidizing in the liquid phase a benzene homologue in which the benzene ring is substituted by at least one alkyl group, one of which has a tertiary carbon atom in the alpha position to the benzene ring, by molecular oxygen, whereby per-compounds are produced therefrom, terminating the oxidation while the resulting reaction mixture contains a substantial amount of unreacted alkyl benzene, reacting said per-compounds dissolved in said unreacted alkyl benzene by bringing the mixture resulting from said oxidation reaction into intimate contact with sulphuric acid until decomposition of the per-compounds is practically complete, and separating the produced phenols and ketone from the resulting reaction mixture.

20. A process for the production of phenols, which comprises oxidizing in the liquid phase a benzene homologue in which the benzene ring is substituted by at least one alkyl group, one of which has a tertiary carbon atom in the alpha position to the benzene ring, by molecular oxygen, whereby per-compounds are produced therefrom, terminating the oxidation while the resulting reaction mixture contains a substantial amount of unreacted alkyl benzene, reacting said per-compounds dissolved in said unreacted alkyl benzene by bringing the mixture resulting from said oxidation reaction into intimate contact with hydrochloric acid until decomposition of the per-compounds is practically complete, and 21. A process for the production of phenols, which comprises oxidizing in the liquid phase a benzene homologue in which the benzene ring is substituted by at least one alkyl group, one of which has a tertiary carbon atom in the alpha position to the benzene ring, by molecular oxygen, whereby per-compounds are produced therefrom, terminating the oxidation while the resulting reaction mixture contains a substantial amount of unreacted alkyl benzene, reacting said per-compounds dissolved in said unreacted alkyl benzene by bringing the mixture resulting from said oxidation reaction into intimate contact with phosphoric acid until decomposition of the per-compounds is practically complete, and separating the produced phenols and ketone from the resulting reaction mixture.

22. A process for the production of phenols, which comprises oxidizing in the liquid phase a benzene homologue in which the benzene ring is substituted by at least one alkyl group, one of which has a tertiary carbon atom in the alpha position to the benzene ring, by molecular oxygen, whereby per-compounds are produced therefrom, terminating the oxidation while the resulting reaction mixture contains a substantial amount of unreacted alkyl benzene, reacting said per-compounds dissolved in said unreacted alkyl benzene by bringing the mixture resulting from said oxidation reaction into intimate contact with tri-chloro-acetic acid until decomposition of the per-compounds is practically complete, and separating the produced phenols and ketone from the resulting reaction mixture.

23. A process for the production of phenols, which comprises oxidizing in the liquid phase a benzene homologue in which the benzene ring is substituted by at least one alkyl group, one of which has a tertiary carbon atom in the alpha position to the benzene ring, by molecular oxygen, whereby per-compounds are produced therefrom, terminating the oxidation while the resulting reaction mixture contains a substantial amount of unreacted alkyl benzene, reacting said per-compounds dissolved in said unreacted alkyl benzene by bringing the mixture resulting from said oxidation reaction into intimate contact with an aryl sulphonic acid until decomposition of the per-compounds is practically complete, and separating the produced phenols and ketone from the resulting reaction mixture.

BASIL VIVIAN ALLER.
REGINALD HAROLD HALL.
DENIS CHESELDEN QUIN.
KARL HEINRICH WALTER TURCK.

REFERENCES CITED

The following references are of record in the file of this patent:

UNITED STATES PATENTS

| Number    | Name         | Date          |
|-----------|--------------|---------------|
| 2,434,888 | Rust et al.  | Jan. 20, 1948 |
| 2,527,640 | Lorand et al.| Oct. 31, 1950 |

OTHER REFERENCES

Hock et al., Berichtee, vol. 77 (1944), pp. 257–264 (8 pages). Abstracted in C. A. 39, col. 3526, 7 (2 pages) (1945).